United States Patent [19]

Czako et al.

[11] 4,145,211

[45] Mar. 20, 1979

[54] METHOD FOR COOLING REDUCED METAL AGGLOMERATES

[75] Inventors: Charles A. Czako, Seven Hills; Andrejs Berzins, Parma; Melvin J. Greaves, Cleveland, all of Ohio

[73] Assignee: Arthur G. McKee & Company, Cleveland, Ohio

[21] Appl. No.: 816,467

[22] Filed: Jul. 18, 1977

Related U.S. Application Data

[63] Continuation-in-part of Ser. No. 594,514, Jul. 9, 1975, abandoned.

[51] Int. Cl.² .......................... C21B 13/00; C22B 1/26
[52] U.S. Cl. ................................. 75/34; 75/3; 75/44 R; 75/90 HP; 75/91; 148/6.3; 148/6.35; 264/111
[58] Field of Search ............... 75/3, 4, 5, 0.5 R, 0.5 B, 75/0.5 BA, 29, 33, 34, 35, 36, 37, 38, 39, 26, 44 R, 44 S, 62, 90 R, 90 HP, 91; 148/6.3, 6.35, 6.31; 423/151, 632, 633; 264/111, 117

[56] References Cited

U.S. PATENT DOCUMENTS

| | | | |
|---|---|---|---|
| 2,766,108 | 10/1956 | Eberhardt et al. | 75/0.5 BA |
| 2,848,316 | 8/1958 | Davis et al. | 75/26 |
| 3,460,818 | 8/1969 | Greaves et al. | 75/3 |
| 3,551,215 | 12/1970 | Claiborne et al. | 148/6.35 |
| 4,076,520 | 2/1978 | Pietsch | 75/226 |

Primary Examiner—L. Dewayne Rutledge
Assistant Examiner—Michael L. Lewis
Attorney, Agent, or Firm—Bosworth, Sessions & McCoy

[57] ABSTRACT

Disclosed is a method of cooling hot agglomerates containing metallic iron resulting from prereduction of iron oxide, by moving ambient atmospheric air rapidly over the agglomerates so that little if any reoxidation of the metallic iron results.

Also disclosed is apparatus comprising a gas permeable support movable in a generally horizontal generally circular path and having a feeding station at which hot particulate material is deposited on the support in a bed of substantially uniform thickness in which the particles are at rest relative to each other, discharge means at another station angularly spaced along the path of travel of said support for lifting the particulate material from the support, means for passing cooling gas through the bed of material on the support as the support travels from the feeding to the discharge station, and means for receiving the discharged cooled material. The discharge means includes a magnetic means movable sufficiently closely to the support to lift off cooled magnetic particulate material and drop it onto a conveyor.

29 Claims, 10 Drawing Figures

METHOD FOR COOLING REDUCED METAL AGGLOMERATES

CROSS REFERENCE TO RELATED APPLICATION

This application is a continuation-in-part of our prior application Ser. No. 594,514 filed July 9, 1975, abandoned.

This invention relates to the cooling of hot particulate material. More particularly it relates to a method of cooling by ambient atmospheric air hot agglomerates containing prereduced metal with little if any reoxidation of the metal; it also relates to apparatus comprising means for passing cooling gases through a bed of material on the support and through the support.

While the invention may be used advantageously for other purposes, it provides particular advantages in the cooling of hot agglomerates containing large proportions of hot metallic iron resulting from direct reduction or prereduction of iron oxide, and therefore will be discussed in this connection.

Production of metallic iron by direct reduction is increasing because substantial savings are often obtainable over the costs of reduction of iron oxide in blast furnaces, because of lower costs of initial plant or fuel or other raw materials, because of availability of advantageously usable fuel or other raw materials, or because of ecological factors as lower pollution. It is desirable that the iron metal be in the form of agglomerates containing substantial amounts of the reduced iron metal, to facilitate use of the iron in steel-making processes or blast furnaces and permit ready handling, storage or transportation.

All direct reduction methods involve the application of heat and a reducing agent to iron oxide. The iron metal immediately after reduction is at a high temperature, which may be as high as 2000° F. (1093° C.). Agglomerates containing such hot reduced iron should be effectively and economically cooled to permit handling, storage or transportation. It is also extremely desirable that during cooling the reduced iron metal should not be substantially reoxidized so that the benefits of prereduction will not be lost, and that the iron should be passivated against substantial reoxidation after cooling.

To avoid such reoxidation, various expedients have been proposed or used, such as cooling the hot agglomerates containing reduced iron in inert or other non-oxidizing atmospheres; such cooling is costly because of the necessity of using cooling apparatus sealed against the atmosphere, or of using expensive inert or non-oxidizing cooling gases which often must be recycled.

Furthermore, apparatus for cooling such hot agglomerates in commercial practice must be capable of effectively cooling large quantities, in daily amounts of at least hundreds of tons, of the hot metal-containing agglomerates, to safe handling temperatures. The apparatus should be rugged in construction and require minimum maintenance or repair, since often such apparatus is located in places close to sources of iron ore or reducing materials or more than one of these materials for production purposes, but not near supplies of technical personnel, equipment, or materials for maintenance purposes. The apparatus should be capable of feeding hot metallized agglomerates onto the cooling means and discharging the cooled metallized agglomerates with minimal damage to or breakage of the agglomerates.

It is, therefore, an object of the invention to provide cooling method and apparatus to meet as many as desired of the above desirable features, and to avoid the above disadvantages.

A further object is the provision of a method by which hot agglomerates of prereduced metal can be rapidly cooled and passivated by ambient atmospheric air with little or no reoxidation of the reduced metal during cooling, and little or no reoxidation during subsequent handling and storage after cooling. The ambient temperature of the atmospheric air depends on location and climatic conditions, and may, for example, be between about −40° F. (−40° C.) and 120° F. (50° C.).

A further object is to provide cooling apparatus, suitable for the method, comprising a generally circular gas-permeable grate that travels in a generally circular path, means for feeding hot particulate material, such as hot agglomerates, onto the grate in a substantially level bed extending across the width of the gas permeable portion of the grate, discharge means that removes the cooled particulate material from the grate, and means for passing air through the bed of particulate material on the grate and the grate to cool the particulate material on the grate.

Another object is the provision of such apparatus for cooling agglomerates of hot magnetic material which includes means providing a magnetic surface above the traveling support by which the magnetic agglomerates will be lifted off the support.

BRIEF DESCRIPTION OF THE DRAWINGS

These and other objects, advantages, and features of the invention will become apparent from the following description in connection with the accompanying drawings in which.

DESCRIPTION OF PREFERRED EMBODIMENTS

The apparatus illustrated for carrying out a method embodying the invention comprises a generally circular gas permeable supporting means 1, rotatable about upright axis A, on which the hot particulate material M is cooled as described below, feed means 2, and discharge means 3. The grate rotates counterclockwise in the direction of the arrow of FIG. 1.

The moving support 1 (FIGS. 1, 2) comprises a rigid frame 4 having a central hub portion 5 mounted on a fixed foundation pedestal 6 for rotating about upright, preferably vertical axis A. Main frame members having the form of radially extending horizontal beams 7 and upwardly and outwardly inclined beams 8 are rigidly fixed at their inner ends to hub portion 5. The outer end of each beam 8 is rigidly connected to the outer end of an associated horizontal beam 7. The outer ends of the beams are fixed to and carry a grate structure, generally identified by reference numeral 9, embodying a gas permeable grate 10 that is generally circular about axis A.

This grate structure (FIGS. 1, 2, 3, 4, 5) comprises generally circular inner and outer upstanding ring-like side frame members 11 and 12. Inner side frame member 11 is fixed, as by welding to the ends of radial members 7 and 8, and the outer frame member 12 is fixed, as by welding, to the outer ends of intermediate auxiliary spoke-type frame members 13, located between the radial members 7 and 8, and preferably tubular for strength, lightness and heat dissipation properties. Members 13 are supported at their inner ends from an intermediate circular frame member 14 fixed to inclined main frame members 8, and intermediate their ends by inner member 11, to cantilever beyond inner member 11.

Each member 13 (FIGS. 3, 4, 5), near inner and outer members 11 and 12, rigidly carries an upwardly projecting lug 15 and side lugs 16 to carry and locate a grate screen support 17. This support comprises (FIGS. 4, 5) radially extending end frame members 18 of channel cross section rigidly fixed to curved side frame members 19 and 20 that extend generally parallel to the curved upstanding members 11 and 12. Each grate screen support rests on lugs 16 of adjacent members 13 and is prevented from movement in the direction of rotation of the grate structure 9 by lugs 15 on adjacent members 13. Intermediate supports 22 fixed and extending between the side frame members 11 and 12 also support the grate screen supports. The screen supports which are segmented in plan, fit closely at their ends and extend completely around the grate structure 9.

Figure 1:
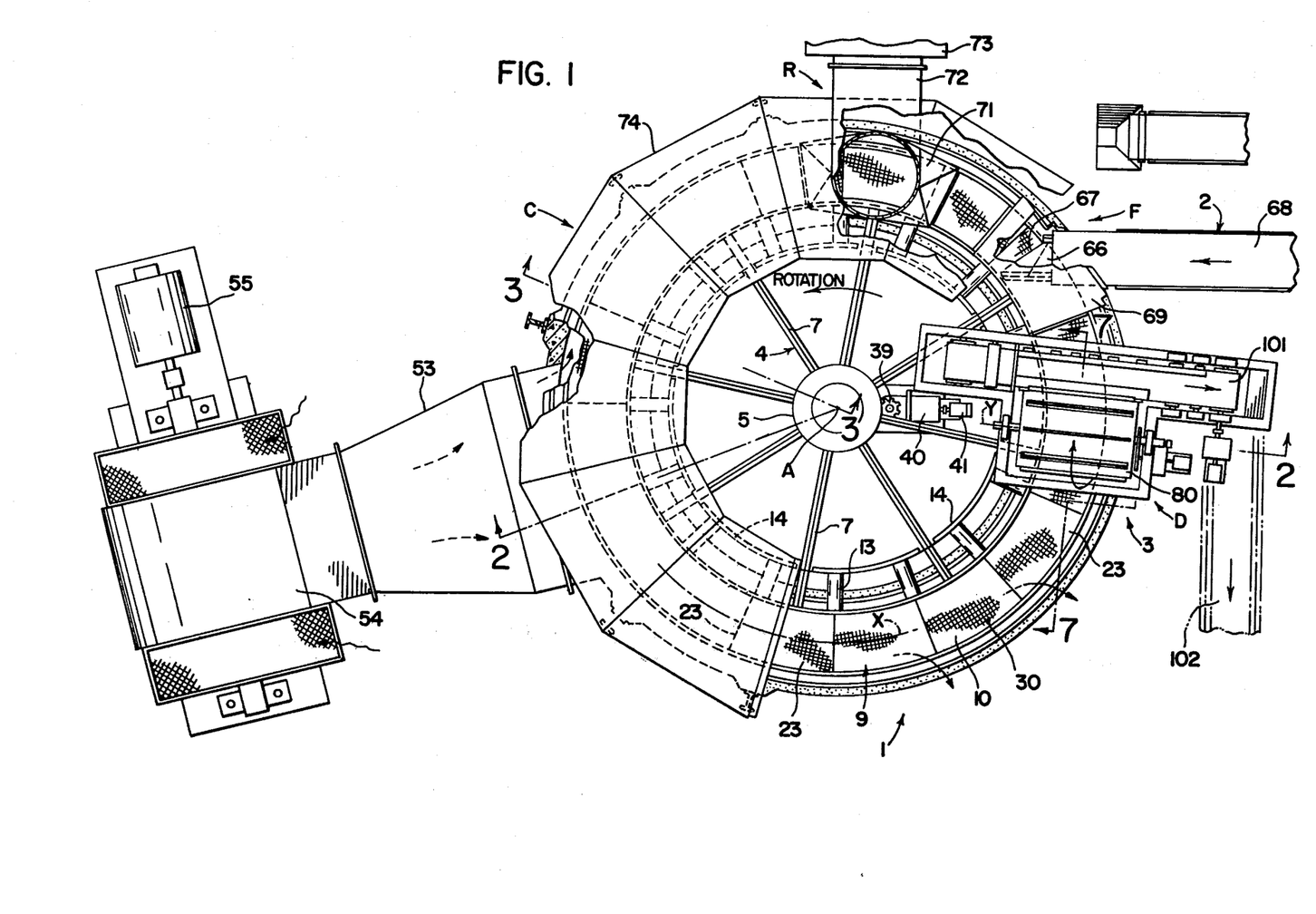
FIG. 1 is a plan view to a small scale of the apparatus as a whole, parts being broken away for the sake of clarity.
Figure 3:
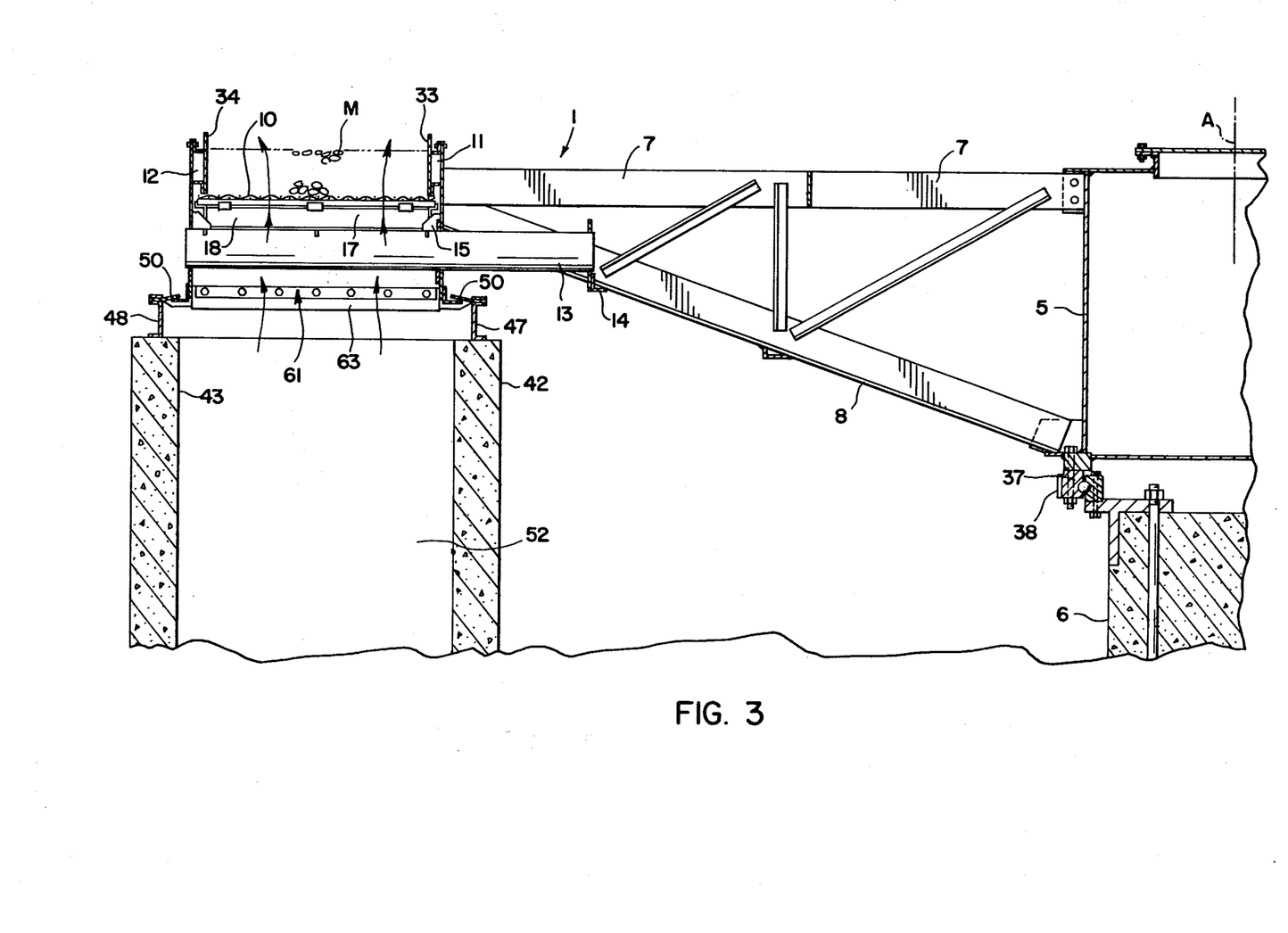
FIG. 3 is a section, to a still larger scale, along line 3—3 of FIG. 1.
Figure 4:
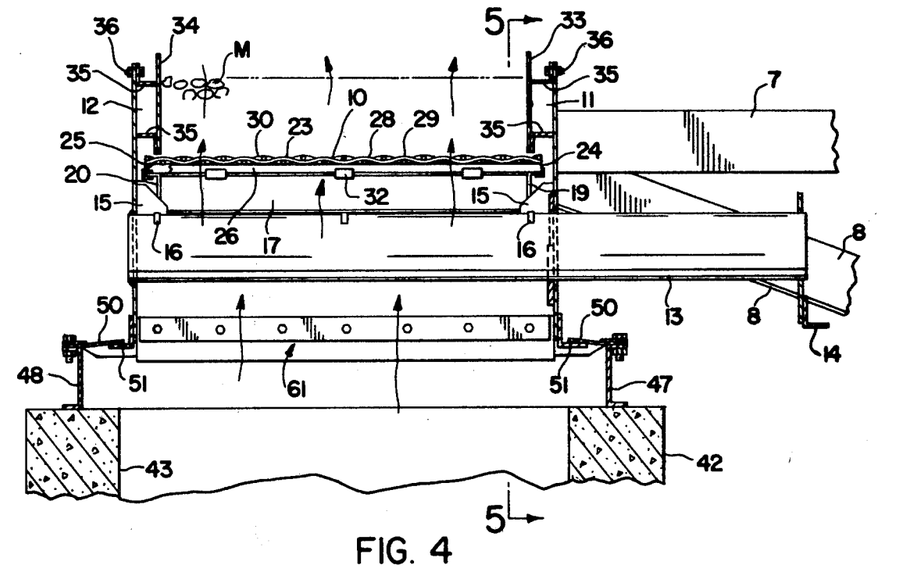
FIG. 4 is an enlarged view corresponding to the left-hand portion of FIG. 3 showing a cross section through the grate.
Figure 5:
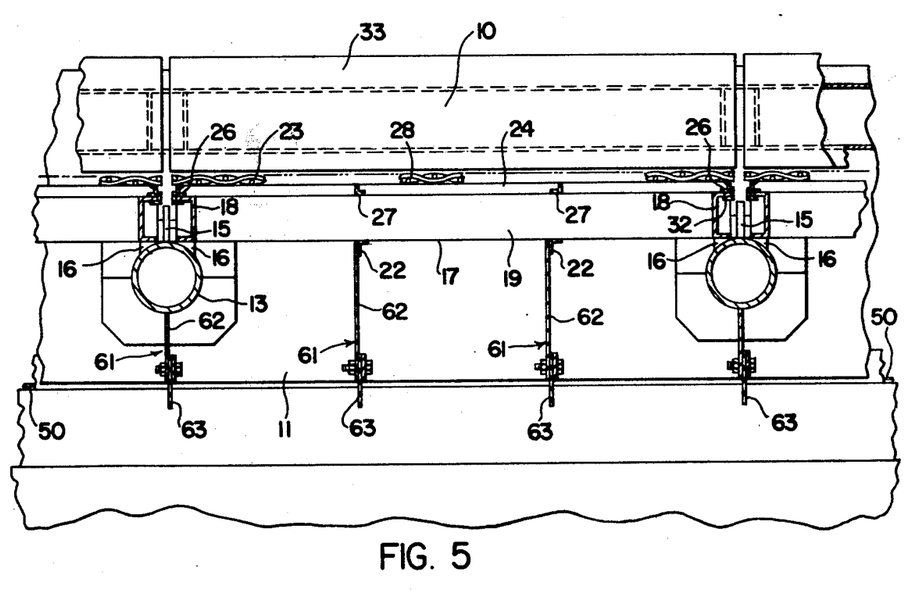
FIG. 5 is a section to the same scale as FIG. 4 along line 5—5 of FIG. 4.

These grate screen supports carry similarly shaped grate segments 23 (FIGS. 1-5), each comprising curved side frame members 24 and 25 shaped to parallel the upstanding side members 11 and 12, radially extending end members 26, and intermediate frame members 27, that are fixed to and support a woven wire screen 28 formed of such a size of wire 29 so spaced by the interstices 30 as to support the particulate material being cooled and make possible the desired flow of cooling gas. As shown in FIGS. 1, 4, the grate segments closely fit to form the gas-permeable generally circular grate 10 and are prevented from moving radially or in the direction of rotation relative to the frame 1 by angular clip members 32 welded or otherwise fixed to frame members of the grate segments 23 and the grate screen supports 17.

The circular grate 10 (FIGS. 3, 4) also comprises inner and outer grate sidewall members 33 and 34 respectively corresponding in length to the adjacent curved side members 24 and 25 of the grate segments. These sidewall members have lower and upper horizontal spacing members 35 that are bolted to the side frame members 11 and 12. The lower edges of the sidewall members are close to the tops of the grate screens 28 to prevent loss of particulate material.

Sidewall members 33 and 34 can be removed by removal of bolts 36 permitting any subassembly formed of any desired grate screen segment 23 and its grate screen support 17 to be removed for inspection or repair by simply lifting this subassembly off the associated members 13 and intermediate supports 22.

The grate and frame structure described above is substantially rigid, subject only to minor deflections arising from load or thermal conditions. It is supported for rotation on pedestal 6 by bearing 37 (FIG. 3), and is adapted to be rotated as required by a ring gear 38 (FIGS. 1, 2, 3, 6) driven from a spur gear 39 rotated through speed reducer 40 by a suitable power source such as electric motor 41.

As it rotates, the circular grate 10 travels over the tops of two generally circular annularly spaced inner and outer gas impervious walls 42 and 43 (FIGS. 1, 2, 3, 4, 6) formed of suitable material, such as reinforced concrete. Walls 42 and 43 are connected by a transverse wall 44 in the vicinity of feed means 2 at feed station F and by another transverse wall 45 in the vicinity of discharge means 3 at discharge station D. A gas impervious bottom wall or base 46 (FIG. 2) is provided between walls 42, 43, 44 and 45.

Continuous inner and outer flanged circular beams 47, 48 are fixed to the top edges of walls 42, 43, and are supported in the space between walls 44 and 45 not closed by walls 42, 43, by frame 49. The upper edges of both beams carry flexible sealing members, such as strips 50 of flexible material of suitable composition, such as synthetic rubber or the like, fixed to and extending around the circumferences of the beams, the bottom surfaces of the strips being slidably engaged by the top surfaces of cooperating continuous metal sealing members 51 fixed to the lower edges of the inner and outer side frame members 11 and 12 and of the grate structure, to provide seals that essentially prevent leakage of air downwardly and transversely into the below described space beneath the grate 10.

Figure 2:
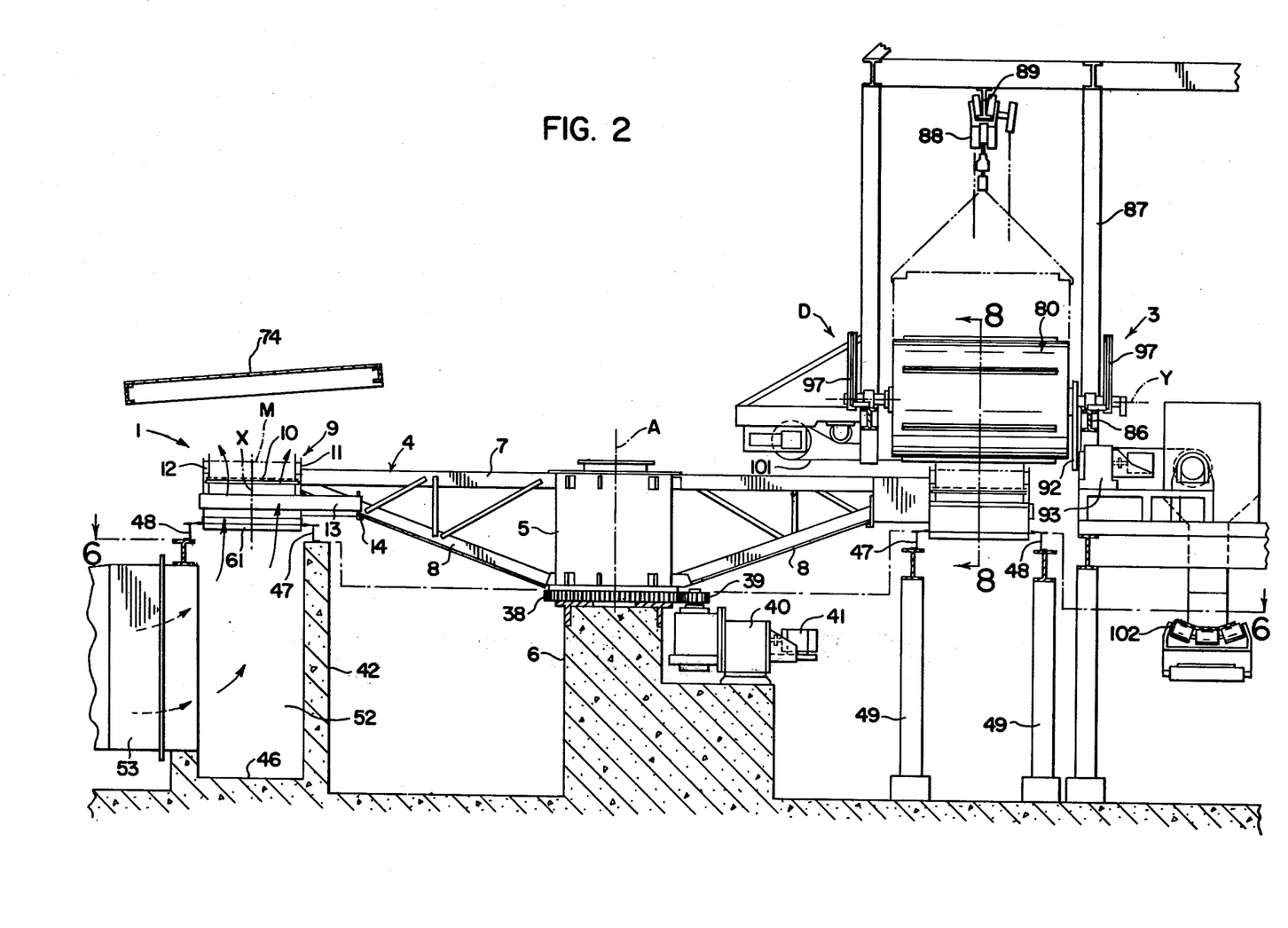
FIG. 2 is a section along line 2—2 of FIG. 1, to a larger scale.
Figure 6:
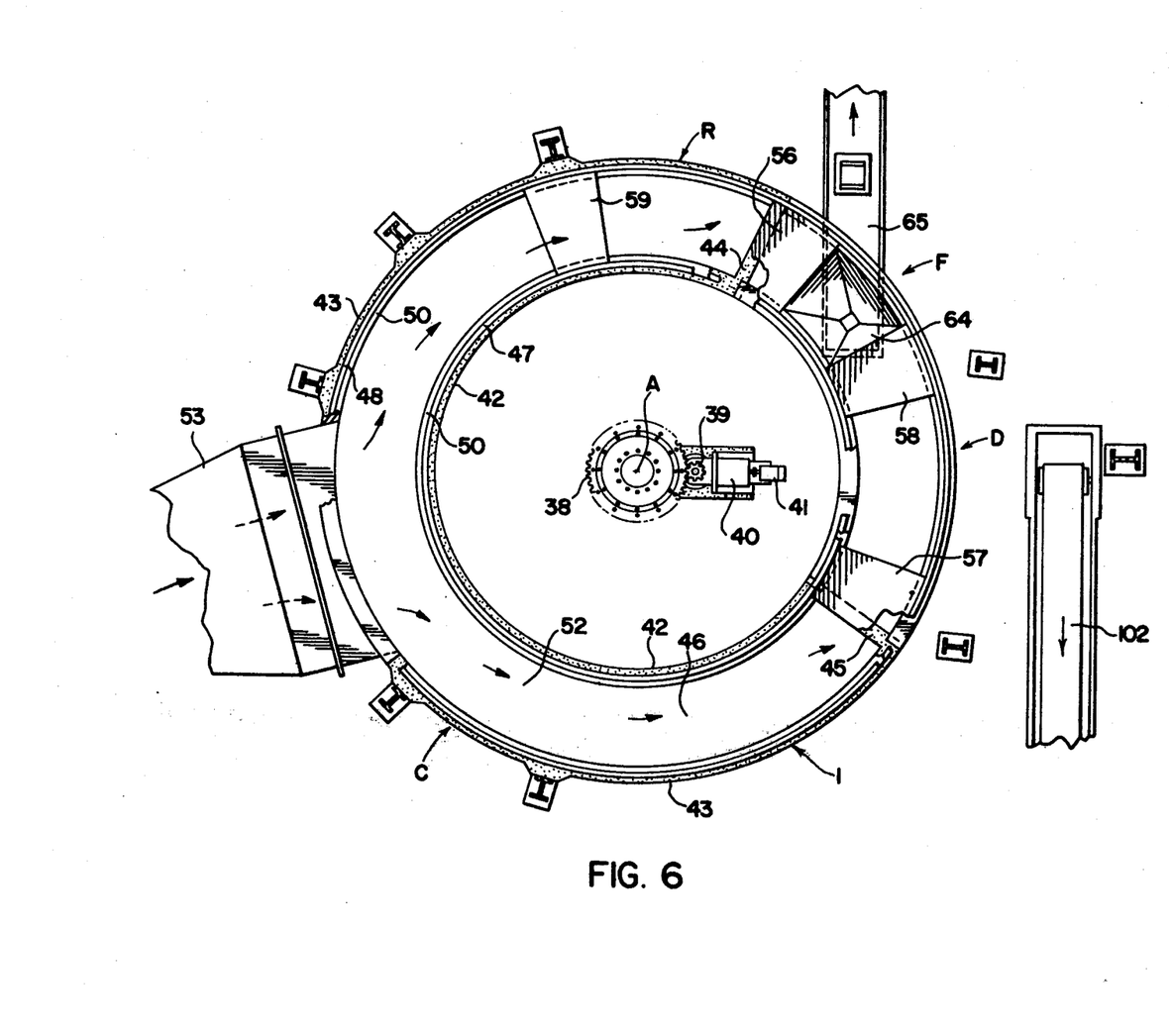
FIG. 6 is a plan view along line 6—6 of FIG. 2 and to the same scale as FIG. 1.

The space between inner and outer walls 42, 43 extending between transverse walls 44 and 45, in cooperation with the bottom wall 46 and the sealing means formed by members 50 and 51 provides a gas enclosure 52 or windbox forming a cooling zone C in which atmospheric ambient air is forced updraft through the bed of material M on the grate screens from gas enclosure into which the air is blown through duct 53 connected to a high capacity blower fan 54 of known design driven by a suitable source of power such as electric motor 55 (FIGS. 1, 2, 6).

Figure 7:
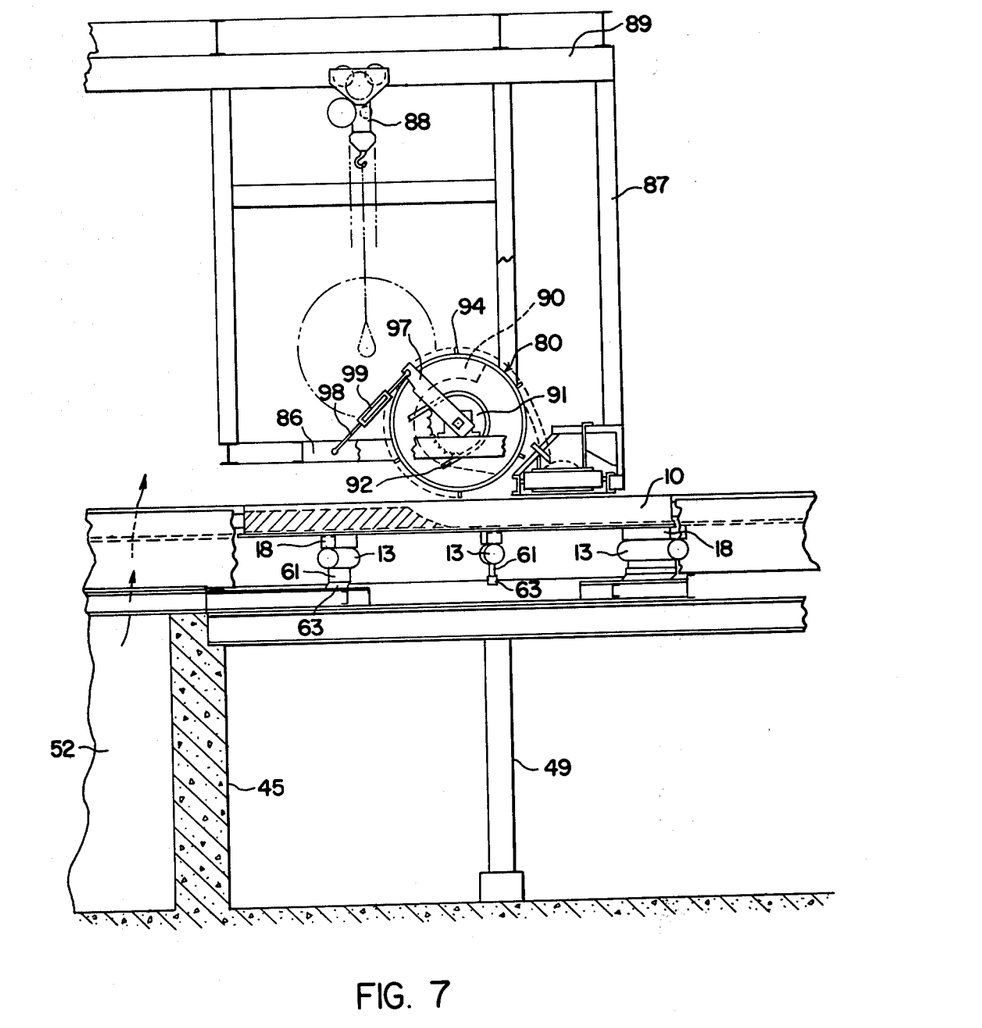
FIG. 7 is a section along line 7—7 of FIG. 1 showing the unloading means at the unloading station.

Dead plates 56 and 57 (FIGS. 6, 7) are respectively fixed gas tight to the tops of the circular sidewalls 42 and 43 and transverse walls 44 and 45 of the feeding station F and discharge station D. A dead plate 58 is also supported at the other end of feed station F at a location spaced from plate 56.

Another dead plate 59 is fixed gas tight to the tops of walls 42 and 43 at a location spaced from and following dead plate 56 in the direction of rotation of the grate.

As the grate 10 rotates about axis A, these dead plates are engaged by transverse sealing members 61 (FIGS. 2-7) fixed to the bottoms of intermediate members 13 and 22. Each member 61 illustrated has a stiff portion 62 formed of metal and a lower flexible portion 63 formed of material such as synthetic rubber or the like that can resiliently engage the various dead plates as the circular grate 10 moves in its circular path. Portions 62 also act as structural members. These transverse sealing members thus act to seal the zones between the dead plates against passage of gas transversely in the direction of travel of the grate, as along the grate and into the windbox 52 from the feeding and discharge stations. Plates 56 and 59 and sealing members 61 cooperate to provide two zones described later in which the cooling air passes updraft through the grate.

Plates 57 and 58 and sealing members 61 also seal the space between these plates at the feed stations, which includes a generally downwardly inwardly converging hopper portion 64 that discharges onto a suitable heat resistant conveyor 65 such as a vibrating conveyor to receive fines or undersized material that passes through the grate screen at the feed station.

The feed means 2 at the loading station F (FIG. 1) comprises a known type of metal vibrating conveyor 66 having a discharge end portion shaped to provide a discharge edge 67 that extends at an angle to the longitudinal axis of the conveyor and generally radially of the circular grate so that the hot particulate material discharged over this edge will form on the grate 10 a substantially flat bed extending essentially completely across the grate. The hot fines or undersized pieces drop through the grate and are removed as indicated above.

The supply conveyor 66 has a gas tight hood 68 that discharges into a hood 69 enclosing the discharge end of the conveyor 66 to prevent the discharge of dust or undesired gases into the atmosphere.

Another hood 71 (FIG. 1) extends over the space between dead plates 57 and 59 (FIG. 6) to define a fines recovery zone R, and is connected through conduit 72 to a known type of fan 73 to pass dust-laden gases to suitable means such as a known stack, now shown, preferably through known dust separation means, not shown. Cooling gas passes updraft through the grate and the material on it in this zone R.

When, as illustrated, the apparatus is not enclosed in a building, a hood 74 (FIGS. 1, 2) extends between this dust collection zone and the major portion of the distance around the grate to the discharge station, to protect the hot particulate material from rain and to prevent access of undesired material to the material on the grate. The ends and sides of the hood are spaced from the grate and the material on it to permit free access and flow of atmospheric ambient cooling air to and through the particulate material while it is carried under the hood by the moving grate.

The discharge means 3 at the discharge station D (FIGS. 1, 2, 7, 8, 9) comprises a magnetic drum 80 mounted for rotation about a horizontal axis Y extending radially of the axis of rotation A of the circular grate. The drum has a cylindrical shell 81 formed of steel or other suitable metal or material supported on end members 82 having hub portions mounted on suitable bearings 83, preferably antifriction bearings, by which the drum is rotatably mounted on a shaft 84 that is rotatably supported by known bearing blocks 85, capable of disassembly, supported by cross members 86 on an auxiliary frame 87 supported by suitable means from above the loading zone. A conventional trolley crane 88 is provided to move along a track 89 to permit the drum to be lifted and removed from the bearing blocks for cleaning or repair if desired.

Figure 9:
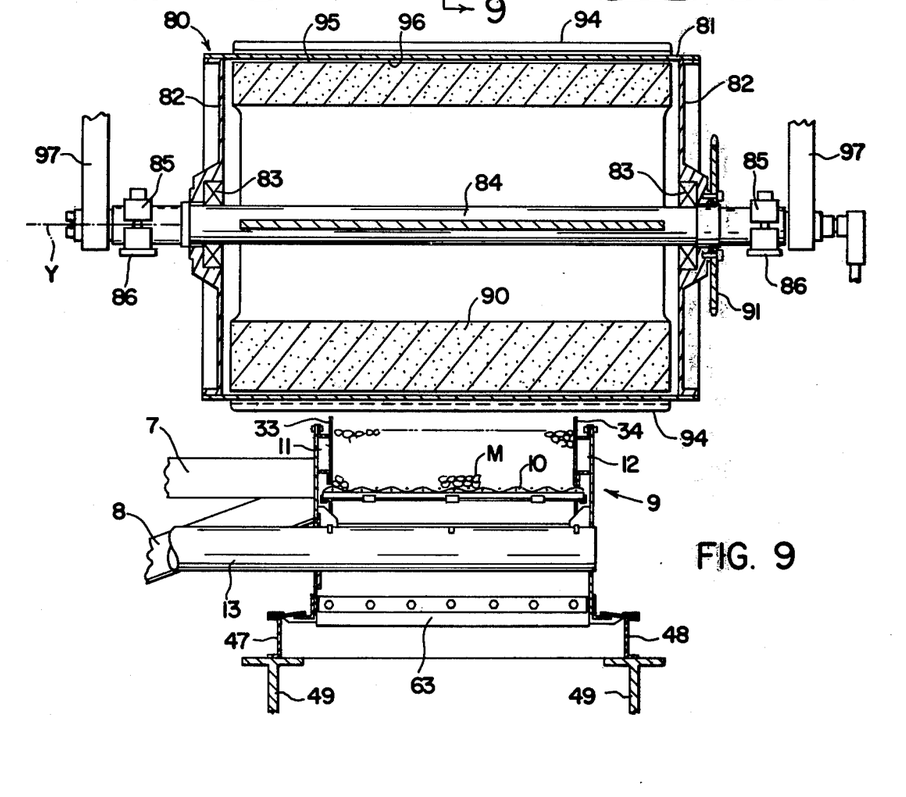
FIG. 9 is a section along line 9—9 of FIG. 8.

As shown in FIGS. 2 and 9, drum 80 is of substantially greater axial length than the width of the material-carrying portion of the circular grate below it; and when mounted in operating position the lower portion of its shell is close to the top edges of the walls 33, 34 of the grate structure. The drum is rotatable by a gear 91 fixed to one end of the drum and driven by a chain 92 from a suitable power source as motor 93. Spaced axially extending ribs 94 are fixed to the outer surface of the drum shell to aid in removing the material from the circular grate.

A magnet 90 (FIGS. 7, 8, 9) which may be an electromagnet or a permanent magnet of known type, is rigidly mounted on shaft 84 and has an outer surface 95 that is in close proximity to the inner surface 96 of the drum shell 81 and that extends axially for substantially the entire internal length of the shell and angularly for a major portion of the internal periphery of the shell. The magnet is considerably thicker and hence provides strongest magnetic forces at its lower portion which is closest to the material on the grate, the upper portions of the magnet being thinner and providing less magnetic force. The magnet is prevented from rotating and angularly located by members 97 fixed to the ends of the shaft 84 and to frame members 86 by links 98 embodying adjustable turnbuckles 99 to permit adjustable angular positioning of the magnet inside the drive shell.

Figure 8:
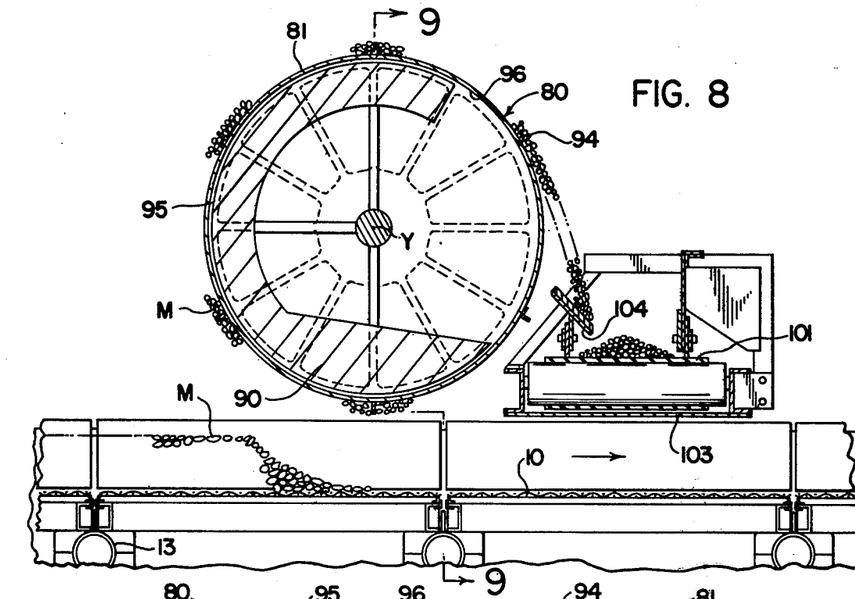
FIG. 8 is an enlarged view of the magnetic unloading means and its associated receiving conveyor, from line 8—8 of FIG. 2.

The drum and magnet are so designed and positioned that as the circular grate 10 moves in a counterclockwise direction, indicated by the arrows in FIGS. 1 and 8, and the drum moves in a clockwise direction as shown in FIG. 8 so that the adjacent surfaces of the drum and grate move in opposite directions, substantially all and preferably all, of the iron-containing particles M constituting the reduced agglomerates are drawn upwardly from the grate onto the surface of the drum and carried by it around the drum past the top center portion of the drum, from where they drop onto a conveyor 101 extending generally parallel to the axis of the drum and transversely of the grate above the grate. Since the particles are cool at this stage, the conveyor may be a conventional belt conveyor of rubberlike material which is power-driven by conventional means to remove the cooled product from the unloading station for suitable disposition, as to another conveyor 102 from which it may pass to storage, to a furnace for using the reduced agglomerates or to transportation means. Preferably a shield 103 is provided beneath conveyor 101 to protect the non-metallic belt from any residual heat of the grate or other parts of the apparatus.

An adjustable inclined guide member 104 is also provided to be contacted by the particles that drop off the unmagnetized portion of the drum and to guide such material onto the conveyor 101.

Apparatus of the above illustrated type is exceptionally advantageous in the cooling of metal iron-containing agglomerates having a high degree of metallization, or amount of conversion of iron oxide to metallic iron, as of between about 80% to 95% or higher, in which the agglomerates result from reduction of finely divided iron oxide such as beneficiized iron ore and agglomeration of the highly metallized reduced particles under pressure is non-oxidizing atmosphere while they are still hot from the reduction process, to form hot agglomerates such as briquettes having low porosity. Such hot agglomerates at the time of discharge by feed conveyor 66 onto the illustrated apparatus are still hot from the reduction of the iron ore particles.

The finely divided iron oxide particles are preferably on the order of 1 cm. or less in maximum dimension. The iron oxides may be high quality iron ore having iron values of 60% or more by weight with the iron in the form of oxides. Most preferably the finely divided particles may be high grade natural iron ore fines which contain no more than about 5% of gangue materials, pass a 4-mesh screen and have not more than 20% by weight of minus 325 mesh material.

Figure 10:
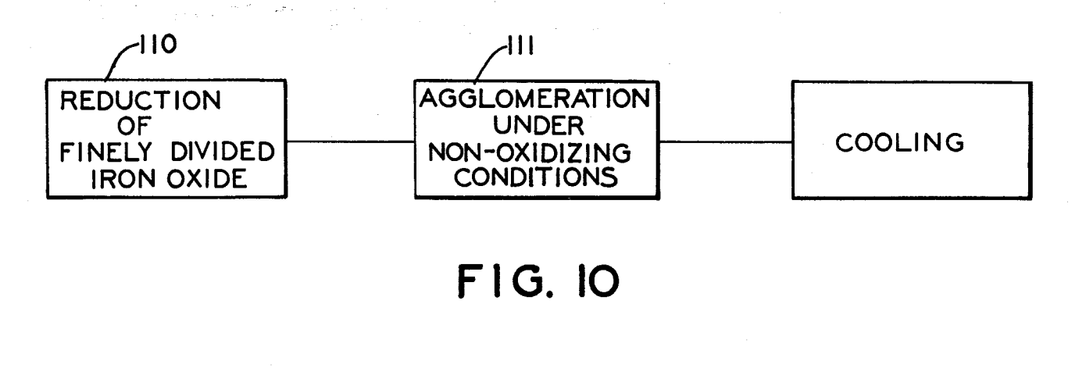
FIG. 10 is a diagram illustrating a method embodying the invention.

As diagrammatically illustrated in FIG. 10, the finely divided iron oxide particles are subjected to a known reducing process by hydrogen-containing reducing gases in a known reduction unit 110 at an elevated temperature. Preferably the reduction is carried out until about 80% to 95%, and if desired even more than 95%, of the iron oxide is converted to metallic iron. While still hot from the reduction process and while subjected to a non-oxidizing, preferably inert atmosphere, the reduced metallic particles are then agglomerated by being subjected to substantial pressures by known process in known apparatus 111, to form agglomerates such as briquettes. Preferably the briquettes are substantially about 3½ inches (9 cm.) long, 2¼ inches (5.7 cm.) wide and one inch (2.54 cm.) thick, weigh between about 1 and 1½ pounds (0.45 to 0.68 kg.) and have a density on the order of 5 grams per cubic centimeter and a porosity between about 15 to 30% and advantageously about 20%.

The briquettes are hot because of the heat of the reduced finely divided metallic particles of which they are agglomerated, and are essentially non-oxidized. The hot briquettes, while in a non-oxidizing preferably inert atmosphere are then passed to cooling apparatus embodying the invention, while at temperatures of as high as 2000° F. (1093° C.), and generally about 1000° F. (538° C.).

As an illustrative example, the cooling apparatus illustrated as embodying the invention is essentially 251 feet (76.2 meters) in diameter on the center line X of the circular grate, and the grate itself is 30 feet (9.20 m.) in width between the grate side walls 33 and 34. The grate is rotating at a linear speed along line X of approximately 7.5 feet (2.4 m.) per minute and the briquettes are deposited on the grate so as to form a level bed substantially 8 inches (20 cm.) thick in which the agglomerates are at rest relative to each other. Ambient atmospheric air at ambient temperature is passed through the grate updraft through fines recovery zone R and updraft through cooling zone C at between 800 to 1000 feet (240 to 300 m.) per minute.

Under the above conditions, the total time for cooling is between 8 to 10 minutes and reduces the temperature of the hot briquettes to a temperature such as a temperature no greater than about 500° F. (260° C.) that will cause no appreciable if any reoxidation on cooling in air and that also permits handling of the briquettes by any of a wide variety of suitable conveying devices. Lower, or even higher, cooled temperatures may be achieved by proper adjustment of the speed of the grate and velocity of air flow.

The briquettes are then removed from the rotating grate by the magnetic unloading means disclosed above and discharged onto conveyors 101 and 102 by which they may be passed to means for conveying them to an oxygen furnace for steel making or to a blast furnace as enriched glast furnace charge, or to storage, or to transportation vehicles.

Notwithstanding the use of ambient atmospheric oxygen-containing air, the rapid rate of cooling with the rapid air flow through the grate causes the briquettes to be cooled with little or no reoxidation of the briquettes or loss of the previously achieved degree of reduction.

In the feed station F, the undersized fines are separated from the briquettes of proper size through the interstices between grate screen wires, and the undersized fines are removed for reuse, as by agglomeration and resupplying to the grate.

The zone R in which the air passes updraft through the grate and the material on the grate removes dust, chips or other fines which were not removed in the loading station, provides an initial cooling of the material on the grate and also provides a cooling action on the grate itself. In zone C which is the major cooling zone, the air passes updraft and the remainder of the desired cooling is achieved.

Because of the relatively thin bed, and the relatively large size, weight, and density of, and the relatively large spaces between, the agglomerates in the bed, they have no tendency to fluidize in the bed on the grate, despite the high velocity of the cooling air.

The briquettes so produced are passivated so that they can be stored in the open air, and yet have so little oxide that they are ideal for continuous charging in electric arc furnace steel making processes or as the coolant in basic oxygen furnace apparatus or processes.

Various modifications may be made in the process illustrated. Other types of gas permeable moving supports other than that illustrated may be used.

The size of the agglomerates may be other than that indicated although the process operates best with agglomerates that are sufficiently large to permit rapid high velocity air flow between them when they are in the bed; preferably the agglomerates or particles being cooled have a cross section of no less than about ⅜ inch (1 cm.) and no greater than about 4½ inches (11.4 cm.). The bed depth may be from 5 to 12 inches (13 to 30 cm.) and is preferably in the neighborhood of 8 inches (20 cm.) to permit the high velocity of cooling air through the bed and grate.

The speed of movement of the bed along its centerline, is preferably from about 5 to 20 feet (1.27 to 4 m.) per minute and preferably between about 6.5 to 8.5 feet (1.65 to 2 m.) per minute.

The air flow through the bed of agglomerates may be at a velocity of 500 to 1500 feet (130 to 380 m.) per minute and is preferably from 800 to about 1000 feet (200 to 250 m.) per minute, measured by known means at the side of the bed at which air enters the bed; the relatively large interstices between the agglomerates in the bed prevent any substantial pressure drop through the bed. Indeed, because the air is heated as it passes through the bed, in general there is no substantial loss of velocity of the air as it passes through the bed.

The apparatus and process disclosed above may be used to cool up to 50 tons (45.4 metric tons) of prereduced iron briquettes per hour. However, apparatus or process embodying the invention may be made to cool larger or smaller amounts of particulate material.

Agglomerates containing iron at a lower degree of metallization may be cooled by the method and apparatus of the invention. The method and apparatus may also be used in the cooling of agglomerates containing other directly reduced metals.

Various other changes may be made in the apparatus and method disclosed above. For example, the dimensions may be different from those indicated, other types of feed means may be used, and other types of discharge means may be used, but those described have been found to be exceptionally advantageous for feeding hot agglomerates and for removing the cooled agglomerates.

Moreover, while in the illustrated apparatus disclosed the cooling accomplished by updraft passage of air, it is apparent that such cooling can be accomplished by downdraft passage of air over all or a portion of the grate. Thus, it is possible to have downdraft passage of air through zone C by drawing the air downwardly through the bed of agglomerates on the grate into gas enclosure 52 and then through fan 54 if it is a suction fan, while having updraft passage of air in zone R, or by other suitable air flows.

While the apparatus specifically disclosed has an axis of rotation A that is vertical, it is possible that the apparatus may have an axis of rotation inclined somewhat from the vertical; the term "upright" as used herein is intended to include such axes as well as vertical axes.

Apparatus embodying the invention may be made and used in which the direction of rotation is different from those disclosed above in the illustrated embodiment.

From the above it can be seen that method and apparatus are provided which may be very advantageously used in the cooling of reduced metallic agglomerates, particularly iron-containing agglomerates. The apparatus is simple and rugged in construction. The method is unique in that it permits the use of ambient atmospheric air for cooling briquettes to passify them with little or no reoxidation and thus solves a long standing problem of making possible low cost rapid cooling of large quantities of hot reduced metallic agglomerates with little or no reoxidation without the use of special gases or complicated apparatus.

Various modifications apparent to those skilled in the art in addition to those indicated above may be made in the apparatus and methods disclosed above and changes may be made with respect to the features provided the elements set forth in any of the following claims or the equivalents of such be employed.

That is claimed is:

1. A method of cooling metallic agglomerates containing a major proportion by weight of metal resulting from direct reduction from an oxide of the metal, comprising reducing finely divided particles of metal oxide by reducing gas at an elevated temperature, agglomerating the reduced metallic particles while they are hot from the reducing step by subjecting them to agglomerating pressure in a non-oxidizing atmosphere to produce agglomerates having a minimal cross section of about $\frac{3}{8}$ inch and a maximum cross section of about $4\frac{1}{2}$ inches, disposing said hot agglomerates while they are at a temperature between approximately 1000° F. and 2000° F. in a moving bed in which the agglomerates are at rest relative to each other, and passing ambient atmospheric air through said bed at a velocity of about 500 feet to 1500 feet per minute that is sufficiently high to cool said agglomerates rapidly in a time of less than 10 minutes to a temperature no greater than about 500° F. without substantial reoxidation of the metal in said agglomerates and by using only said air as the cooling gas.

2. The method of claim 1 in which said metallic agglomerates contain reduced metallic iron having a degree of metallization of between 80% and 95%.

3. The method of claim 1 in which said bed is from 5 to 12 inches in thickness.

4. The method of claim 1 in which said air is passed through said bed at a velocity of between about 800 to 1000 feet per minute.

5. The method of claim 1 in which said bed is approximately 8 inches thick.

6. The method of claim 1 in which said hot metallic agglomerates contain reduced iron, in which said agglomerates are disposed in a bed substantially from 5 to 12 inches thick and in which air passed through said bed at a velocity of from about 500 to 1500 feet per minute.

7. The method of claim 1 in which said agglomerates are disposed in a bed approximately 8 inches thick, said air is passed through said bed at a velocity of from 800 to 1000 feet per minute, and in which said cooling is accomplished in from about 8 to 10 minutes.

8. The method of claim 1 in which said air is passed through said bed from an air supply area while relative movement occurs between said bed and said air supply area.

9. The method of claim 1 in which said air is passed through said bed from an air supply area while said bed is moving past said air supply area in a circular path.

10. The method of claim 1 in which said agglomerates have a porosity of about 15 to 25 percent.

11. A method of cooling hot metallic iron-containing agglomerates that are at an elevated temperature in which agglomerates the metallic iron in the agglomerates has been produced by reduction of finely divided iron oxide particles and the agglomerates are then formed by compressing the reduced particles while hot from the reduction step into agglomerates in a non-oxidizing atmosphere and said elevated temperature of the agglomerates at the beginning of the cooling is at least about 1000° F. and is that which resulted from the reduction process, which agglomerates have a minimum cross sectional dimension of about $\frac{3}{8}$ inches and a maximum cross sectional dimension of about $4\frac{1}{2}$ inches, which method comprises disposing the hot agglomerates into a bed from about 5 inches to about 12 inches thick in which bed the agglomerates are at rest restively to each other, and passing only ambient atmospheric air through said bed at a velocity of about 500 to 1500 feet per minute until the agglomerates are cooled to a temperature no greater than about 500° F. in a time no greater than about 10 minutes without substantial reoxidation of the metallic iron.

12. The method of claim 11 in which said reduced metallic iron has a degree of metallization of between about 80% and 95%.

13. The method of claim 11 in which said air is passed through said bed at a velocity of between 800 to 1000 feet per minute.

14. The method of claim 11 in which said bed is approximately 8 inches thick.

15. The method of claim 11 in which said bed is approximately 8 inches thick and said air is passed through said bed at a velocity of between about 800 to 1000 feet per minute.

16. The method of claim 15 in which said metal-containing agglomerates contain reduced metallic iron have a degree of metallization of between about 80% and 95%.

17. The method of claim 8 in which said relative movement is between 5 to 20 feet per minute.

18. The method of claim 8 in which said air is passed through said bed while said bed is moving past said air supply area.

19. The method of claim 11 in which said air is passed through said bed in an air supply area while relative movement occurs between said bed and said air supply area.

20. The method of claim 19 in which said air is passed through said bed while said bed is moving past said air supply area.

21. The method of claim 19 in which said relative movement is between about 5 to 20 feet per minute.

22. The method of claim 19 in which said air is passed through said bed while said bed is moving past said air supply area in a circular path.

23. The method of claim 11 in which said air is passed through said bed at a velocity between about 800 to 1000 feet per minute from an air supply area while said bed is moving past said air supply area at a speed of from about 6.5 to 8.5 feet per minute.

24. The method of claim 11 in which said agglomerates prior to cooling have a porosity of about 15 to 25 percent.

25. A method of cooling metallic agglomerates containing a major proportion by weight of metal resulting from direct reduction from an oxide of the metal, comprising reducing finely divided particles of metal oxide at an elevated temperature, agglomerating the reduced metallic particles while they are hot from the reducing step by subjecting them to agglomerating pressure in a non-oxidizing atmosphere thereby forming agglomerates capable of resisting substantial reoxidation during a rapid cooling step, disposing said agglomerates in a moving bed in which the agglomerates are at rest relative to each other and while they are hot and at a temperature of at least about 1000° F. from the reducing step, and passing ambient atmospheric air through said bed at a velocity sufficiently high to cool said agglomerates rapidly to a temperature no greater than about 500° F. in a time of less than about 10 minutes, to perform said cooling step without substantial reoxidation of the metal in said agglomerates and by using only said air as the cooling gas.

26. The method of claim 25 in which said metallic agglomerates contain reduced metallic iron having a degree of metallization between about 80% and 95%.

27. The method of claim 25 in which said bed is from 5 to 12 inches in thickness.

28. The method of claim 25 in which said air is passed through said bed at a velocity of between about 500 to 1500 feet per minute.

29. The method of claim 25 in which said agglomerates are disposed in a bed approximately 8 inches thick and said air is passed through said bed at a velocity of from 800 to 1000 feet per minute, and in which said cooling is accomplished in from about 8 to 10 minutes.

* * * * *